(12) United States Patent
Dohi et al.

(10) Patent No.: US 10,012,334 B2
(45) Date of Patent: Jul. 3, 2018

(54) STRUCTURE FOR ATTACHING PRESSURE DETECTOR

(71) Applicants: FUJIKIN INCORPORATED, Osaka (JP); NIDEC COPAL ELECTRONICS CORPORATION, Tokyo (JP)

(72) Inventors: Ryousuke Dohi, Osaka (JP); Kouji Nishino, Osaka (JP); Nobukazu Ikeda, Osaka (JP); Masaki Fukasawa, Iruma (JP); Katsumi Ishiguro, Iruma (JP)

(73) Assignees: FUJIKIN INCORPORATED, Osaka (JP); NIDEC COPAL ELECTRONICS CORPORATION, Tokyo (JP)

( * ) Notice: Subject to any disclaimer, the term of this patent is extended or adjusted under 35 U.S.C. 154(b) by 398 days.

(21) Appl. No.: 14/780,404

(22) PCT Filed: Mar. 7, 2014

(86) PCT No.: PCT/JP2014/001273
§ 371 (c)(1),
(2) Date: Sep. 25, 2015

(87) PCT Pub. No.: WO2014/155994
PCT Pub. Date: Oct. 2, 2014

(65) Prior Publication Data
US 2016/0053925 A1     Feb. 25, 2016

(30) Foreign Application Priority Data
Mar. 28, 2013 (JP) ................. 2013-068217

(51) Int. Cl.
*F16K 41/00* (2006.01)
*F16L 21/03* (2006.01)
(Continued)

(52) U.S. Cl.
CPC ............. *F16L 21/03* (2013.01); *F16L 21/04* (2013.01); *G01L 9/0051* (2013.01);
(Continued)

(58) Field of Classification Search
CPC ... F16L 41/008; G01L 19/0007; G01L 19/003
See application file for complete search history.

(56) References Cited

U.S. PATENT DOCUMENTS 3,041,880 A * 7/1962 McCarvell .......... G01L 19/0007
                                              73/756
4,041,761 A * 8/1977 Conti .................. G01L 19/0007
                                              73/706
(Continued)

FOREIGN PATENT DOCUMENTS

EP    1471341 A1 * 10/2004 ......... G01L 19/0007
JP    S61-202041 U    12/1986
(Continued)

OTHER PUBLICATIONS

International Search Report from PCT/JP2014/001273 dated Apr. 8, 2014.

*Primary Examiner* — David Bochna
(74) *Attorney, Agent, or Firm* — Studebaker & Brackett PC

(57) ABSTRACT

An attachment structure for a pressure detector that is such that the pressure detector is attached in an airtight manner within an insertion hole of an attachment tool main body attached to a mechanical device or pipelines, with a pipe, a gasket presser, a gasket, a split ring, and a bonnet. The configuration is such that the gasket presser and the split ring are inserted into the insertion hole of the attachment tool main body, the bonnet is inserted into the insertion hole, the bonnet is fastened to the attachment tool main body side, the gasket presser and the gasket are pressed by the split ring, and sealing portions are formed between the bottom surface
(Continued)

of the insertion hole and one end surface of the gasket and between the tip end surface of the gasket restraint and the other end surface of the gasket.

5 Claims, 13 Drawing Sheets

(51) Int. Cl.
    *G01L 19/14*     (2006.01)
    *G01L 19/00*     (2006.01)
    *F16L 21/04*     (2006.01)
    *G01L 9/00*     (2006.01)
    *F16L 41/00*     (2006.01)

(52) U.S. Cl.
    CPC .......... *G01L 19/003* (2013.01); *G01L 19/145* (2013.01); *G01L 19/147* (2013.01); *F16L 41/008* (2013.01)

(56) References Cited

U.S. PATENT DOCUMENTS

| | | | |
|---|---|---|---|
| 4,192,192 A * | 3/1980 | Schnell | G01L 19/0007 73/706 |
| 5,605,360 A | 2/1997 | Kurisaki et al. | |
| 8,099,856 B2 * | 1/2012 | Lutz | G01L 19/0007 29/709 |
| 9,765,802 B2 * | 9/2017 | Gros D'Aillon | G01L 19/0007 |
| 2004/0040383 A1 | 3/2004 | Banholzer et al. | |
| 2009/0126808 A1 | 5/2009 | Katsura | |
| 2017/0370792 A1 * | 12/2017 | Hasunuma | G01L 19/0007 |

FOREIGN PATENT DOCUMENTS

| | | |
|---|---|---|
| JP | S62-009143 U | 1/1987 |
| JP | H08-075585 A | 3/1996 |
| JP | 3494594 B2 | 11/2003 |
| JP | 2004-511795 A | 4/2004 |
| JP | 2006-313006 A | 11/2006 |

* cited by examiner

STRUCTURE FOR ATTACHING PRESSURE DETECTOR

FIELD OF THE INVENTION

The present invention relates to an improvement of the structure for attaching a diaphragm type pressure detector utilizing a pressure detecting element (pressure sensitive element or strain gauge), which are mainly used for gas supply systems in semiconductor manufacturing facilities.

BACKGROUND OF THE INVENTION

Heretofore, diaphragm type pressure detectors utilizing pressure detecting elements (for example, pressure sensitive elements) have been widely used for detecting hydrostatic pressures in conduit lines (for example, refer to patent document 1).

FIGS. 9 to 11 show examples of a conventional diaphragm type pressure detector 30. The pressure detector 30 is composed of a sensor base 31, a pressure detecting element 32, a diaphragm base 34 including a diaphragm 33, a pressure transmission medium 35 (silicone oil), a sealing ball 36, a lead pin 37, and other components. When a hydrostatic pressure 38 applied onto the pressure detecting element 32 via the diaphragm 33 and the pressure transmission medium 35, a voltage signal which is proportionate to the pressure from a semiconductor pressure transducer forming the pressure detecting element 32 is output to the outside via the lead pin 37.

FIGS. 12 to 14 are enlarged fragmentary cross-sectional views which show examples of the structure for attaching the diaphragm type pressure detector 30 mentioned above to the conduit lines and the like, where the pressure detector 30 is attached and fixed into a insertion hole 40 of an attachment tool main body 39 attached to the pipelines or mechanical devices by a pressing member 41 and a fastener 42 through a gasket 43 in an airtight manner.

That is, the pressure detector 30 is attached to the inside of the insertion hole 40 of the attachment tool main body 39 through the gasket 43 in an airtight manner by sequentially inserting the gasket 43, the pressure detector 30 and the pressing member 41 into the insertion hole 40 of the attachment tool main body 39, tightening and fixing the pressing member 41 by the fastener 42 and bolts (not illustrated) to the attachment tool main body 39 side, and pressing a flange portion 34a of the diaphragm base 34 or both flange portions 31a, 34a of a sensor base 31 and the diaphragm base 34 by the front end of the pressing member 41.

In the structure for attaching the pressure detector 30, when the pressing member 41 is tightened and fixed to the attachment tool main body 39 side by the fastener 42 and bolts, compressive forces in the upward and downward directions (reactions in the upward and downward directions) are applied onto the flange portion 34a of the diaphragm base 34 or both flange portions 31a, 34a of the sensor base 31 and diaphragm base 34 through the pressing member 41 and the gasket 43.

During tightening and fixing by the pressing member 41, if a stress should be applied on the diaphragm 33 because of the compressive forces applied to the flange portion 34a of the diaphragm base 34 or both flange portions 31a, 34a of the sensor base 31 and the diaphragm base 34 in the upward and downward directions (for example, even when components of the compressive forces in the upward and downward directions are generated, and these are applied onto the diaphragm 33), a shallow groove 34b provided on the flange portion 34a of the diaphragm base 34 and a shallow groove 31b provided on the flange portion 31a of the sensor base 31 make the wall thickness of this portion small, and therefore the displacement due to the stress is absorbed in the vicinity of the thin portion.

This prevents the stress from being directly transmitted to the diaphragm 33, and prevents the diaphragm 33 from being deformed.

Consequently, in the structure for attaching the conventional pressure detector 30, changes in output and temperature characteristics before and after the pressure detector 30 is attached to the attachment tool main body 39 become extremely small, and excellent practical effects are produced.

However, in the structure for attaching the conventional pressure detector 30 mentioned above, when the pressure detector 30 is fixed to the insertion hole 40 of the attachment tool main body 39, it is difficult to completely eliminate the stress warping of the diaphragm 33, and there is the problem that the output and temperature characteristics change before and after the integration of the pressure detector 30 to the attachment tool main body 39.

This is because the extremely thin diaphragm 33 having a thickness of about 0.05 mm to 0.06 mm is provided in a position near the flange portion 34a of the diaphragm base 34 on which the compressive forces in the upward and downward directions are applied, and therefore a component of the compressive force is inevitably applied on the diaphragm 33.

Moreover, the fastener 42 and bolts may be loosened after the integration of the pressure detector 30 into the attachment tool main body 39 due to aged deterioration and the pressing force of the pressing member 41 may be lowered in some cases. In this case, there is the problem that the compressive force applied to the flange portion 34a of the diaphragm base 34 or both flange portions 31a, 34a of the sensor base 31 and the diaphragm base 34 is changed and the stress applied on the diaphragm 33 is also changed, so that the output and temperature characteristics are greatly varied.

CITATION LIST

Patent Literature

Patent document 1: Japanese Patent No. 3494594

Technical Problems

The present invention aims to solve the above-mentioned problem occurring in the case where the diaphragm type pressure detector is actually attached and fixed to a pipeline or the like, that is, the problem that the output and temperature characteristics are changed due to the variation in the stress warping of the diaphragm occurring in the case where the pressure detector is integrated into the attachment tool main body and the measurement precision of the pressure detector is therefore lowered, and an object thereof is to provide a structure for attaching a pressure detector in which no stress influence is exerted on the diaphragm even after the integration of the pressure detector into the attachment tool main body, and no influence of aged deterioration is exerted on the pressure detector.

SUMMARY OF THE INVENTION

Solution to the Problems

In order to achieve the above object, a first aspect of the present invention is a structure for attaching a pressure detector air-tightly into an insertion hole of an attachment tool main body attached to pipelines or mechanical devices comprising:

a pressure detector having:
- a casing forming a pressure introduction hole,
- a pressure receiving chamber being provided in the casing and communicating with the pressure introduction hole,
- a diaphragm displacing depending on the pressure of the pressure receiving chamber, and
- a pressure detecting element converting a pressure caused by the displacement of the diaphragm into an electrical signal; and the structure for attaching the pressure detector comprising:
- a pipe protruding outwardly on the casing and forming the pressure introduction hole;
- an annular gasket presser with a diameter larger than the pipe provided at the front end of the pipe;
- an annular gasket provided on the bottom face of the insertion hole of the attachment tool main body and abutting against the front end surface of the gasket presser;
- a split ring abutting against the face opposite to the front end face of the gasket presser; and
- a bonnet pressing the split ring removably inserted into the insertion hole of the attachment tool main body, wherein:

the gasket presser and the split ring are inserted into the insertion hole of the attachment tool main body, the bonnet is inserted into the insertion hole and tightened on a side of the attachment tool main body, the gasket presser and the gasket are pressed by the split ring, sealing portions are formed between one end face of the gasket and the bottom face of the insertion hole and also between another end face of the gasket and the front end face of the gasket presser.

A second aspect of the present invention is a structure for attaching a pressure detector air-tightly into an insertion hole of an attachment tool main body attached to pipelines or mechanical devices comprising:

a pressure detector having:
- a casing forming a pressure introduction hole,
- a pressure receiving chamber provided in the casing and communicating with the pressure introduction hole,
- a diaphragm displacing depending on the pressure of the pressure receiving chamber, and
- a pressure detecting element converting a pressure caused by the displacement of the diaphragm into an electrical signal;

the structure for attaching the pressure detector comprising:
- a pipe protruding outwardly on the casing and forming the pressure introduction hole;
- an annular gasket presser with a diameter larger than the pipe provided at the front end of the pipe,
- an annular gasket provided on the bottom face of the insertion hole of the attachment tool main body and abutting against the front end face of the gasket presser; and,
- a U-shaped ring abutting against the face opposite to the front end face of the gasket presser and having an insertion portion that the pipe is inserted, and
- a bonnet removably inserted into the insertion hole of the attachment tool main body to press the U-shaped ring, wherein:

the gasket presser and the U-shaped ring are inserted into the insertion hole of the attachment tool main body, the bonnet is inserted into the insertion hole, and tightened to a side of the attachment tool main body, the gasket presser and the gasket are pressed by the U-shaped ring, sealing portions are formed between one end face of the gasket and the bottom face of the insertion hole and also between the other end face of the gasket and the front end face of the gasket presser.

A third aspect of the present invention is that the diaphragm of the pressure detector includes:
- a partition diaphragm receiving pressure from the pressure introduction hole,
- a pressure detecting diaphragm having the pressure detecting element, and
- a pressure chamber filled with a pressure transmission medium between the partition diaphragm and the pressure detecting diaphragm.

A fourth aspect of the present invention is that in the first aspect, the split ring is divided into two parts along the diameter direction; the bonnet is configured as a cylindrical bonnet having an inner diameter larger than an outer diameter of the gasket presser and smaller than an outer diameter of the split ring; and the bonnet is removably screwed into the insertion hole of the attachment tool main body.

Advantageous Effects of the Invention

Since the present invention is so configured that the pressure receiving chamber is provided within the casing of the pressure detector, the diaphragm which is displaced depending on the pressure of the pressure receiving chamber is provided in the casing, a pipe on which a pressure introduction hole for communicating with the pressure receiving chamber is provided in the casing in a protruding state, a gasket presser is provided at the front end portion of the pipe, the gasket presser is inserted into an insertion hole of an attachment tool main body attached to a pipeline and the like and the front end face of the gasket presser is brought into contact with one end face of a gasket provided on the bottom face of the insertion hole, a split ring or U-shaped ring is brought into contact with the face opposite to the front end face of the gasket presser, and further the bonnet is inserted into the insertion hole of the attachment tool main body to tighten the same to the attachment tool main body side, whereby the gasket presser and the gasket are pressed via the split ring or U-shaped ring, and sealing portions are formed between one end face of the gasket and the bottom face of the insertion hole and between the other end face of the gasket and the front end face of the gasket presser, respectively, even when the distance between the gasket presser receiving the compressive force by the pipe in which the pressure introduction hole is formed and the diaphragm of the pressure detector is increased and the gasket presser received the compressive force, no component of the force is transmitted to the diaphragm.

As a result, in the present invention, no stress influence is exerted on the diaphragm even after the integration of the pressure detector into the attachment tool main body, and no change is made in the output and temperature characteristics before and after the attachment of the pressure detector to the attachment tool main body.

Moreover, in the present invention, even if the tightening force of the bonnet is reduced due to aged deterioration after the integration of the pressure detector to the attachment tool main body and the compressive force of the gasket presser is changed, the distance between the gasket presser which receives the compressive force and the diaphragm of the pressure detector is wide, and therefore there is no influence of the stress on the diaphragm, and the diaphragm is not affected by aged deterioration.

Furthermore, since the present invention is so configured that the split ring is divided into two parts along the diameter direction, and the bonnet is formed to be a cylindrical bonnet having an inner diameter which is larger than the outer diameter of the gasket presser and smaller than the outer diameter of the split ring, and the bonnet is removably screwed into an insertion hole of the attachment tool main body, even though the gasket presser having a diameter larger than the pipe is provided at the front end portion of the pipe of the pressure detector, the pressure detector can be integrated and fixed into the insertion hole of the attachment tool main body, allowing great convenience.

DESCRIPTION OF THE EMBODIMENTS

Embodiments of the present invention will be described below with reference to drawings.

Figure 1:
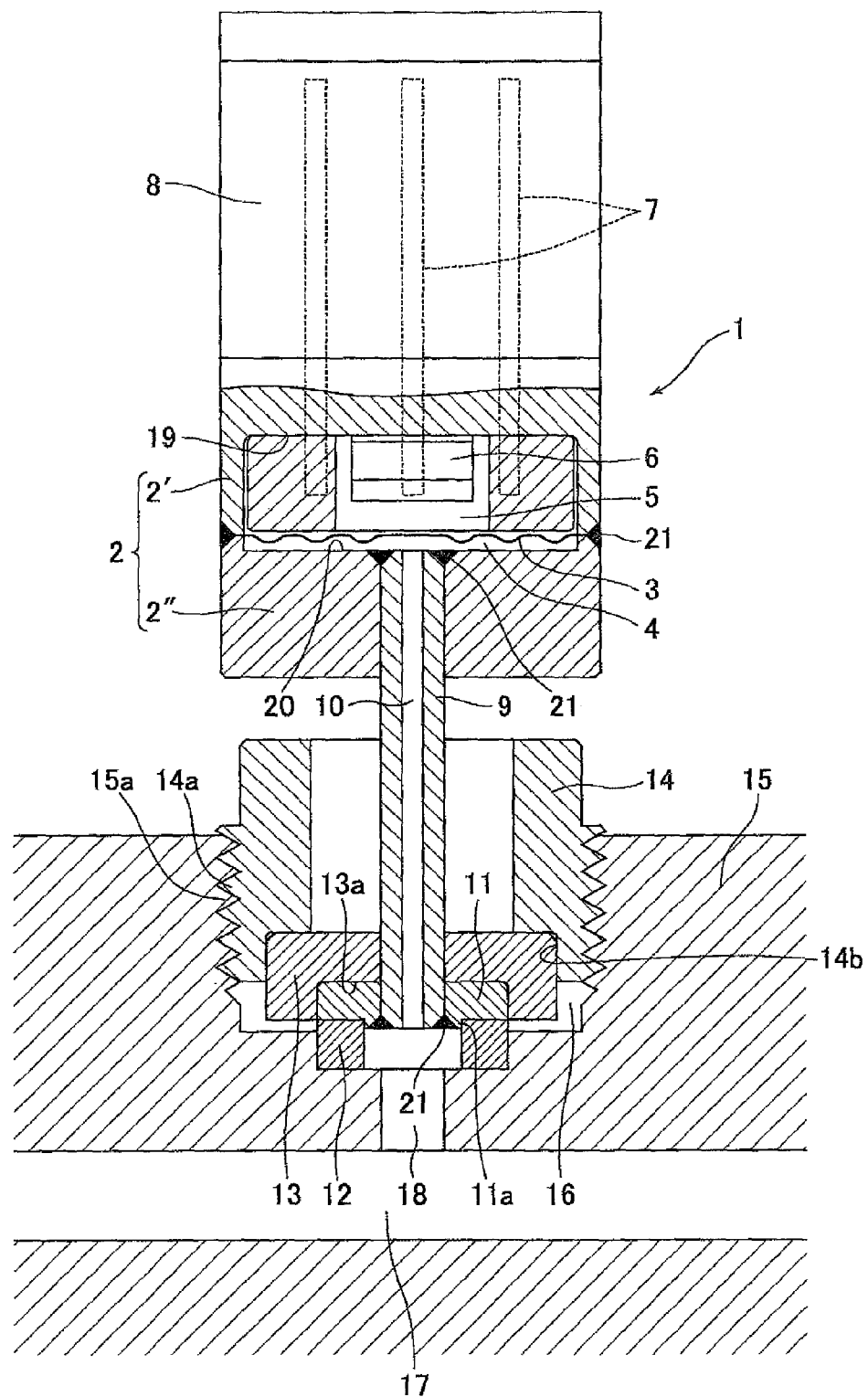
FIG. 1 is a longitudinal sectional view showing a structure for attaching a pressure detector according to an embodiment of the present invention.

FIG. 1 shows an embodiment of the present invention according to the structure for attaching the pressure detector. In FIG. 1, reference numeral 1 represents a diaphragm type pressure detector, 2 represents a casing composed of a sensor base 2' and a tube base 2", 3 represents a partition diaphragm, 4 represents a pressure receiving chamber in the casing 2, 5 represents a pressure chamber in the casing 2, 6 represents a pressure detecting element provided with a pressure detecting diaphragm (not illustrated), 7 represents a lead pin, 8 represents a cover, 9 represents a pipe, 10 represents a pressure introduction hole, 11 represents a gasket presser, 12 represents a gasket, 13 represents a split ring, 14 represents a bonnet, 15 represents an attachment tool main body attached to pipelines or mechanical devices, 16 represents an insertion hole of a pressure detector 1 formed on the attachment tool main body 15, 17 represents a passage formed on the attachment tool main body 15, 18 represents a communication hole which brings the insertion hole 16 and the passage 17 into communication.

It should be noted that the diaphragm of the pressure detector 1 is composed of the partition diaphragm 3 and the pressure detecting diaphragm.

The structure for attaching the pressure detector 1 includes, as shown in FIG. 1, the pipe 9 provided on the casing 2 in a state of protruding outwardly to form the pressure introduction hole 10, the annular gasket presser 11 provided at the front end of the pipe 9, the gasket 12 to which the front end face of the gasket presser 11 is inserted at the bottom of the insertion hole 16 of the attachment tool main body 15, the split ring 13 which comes into contact with the face on the side opposite to the front end face of the gasket presser 11, and the bonnet 14 which is removably inserted into the insertion hole 16 of the attachment tool main body 15 and presses the split ring 13, in which the gasket presser 11 and the split ring 13 are inserted into the insertion hole 16 of the attachment tool main body 15, and the bonnet 14 is inserted into the insertion hole 16, and the bonnet 14 is tightened to the attachment tool main body 15 side to press the gasket presser 11 and the gasket 12 by the split ring 13, so that sealing portions are formed between one end face of the gasket 12 and the bottom face of the insertion hole 16 and between the other end face of the gasket 12 and the front end face of the gasket presser 11, respectively.

The pressure detector 1 is a diaphragm type pressure sensor using the pressure detecting element 6 (pressure sensitive element).

Figure 2:
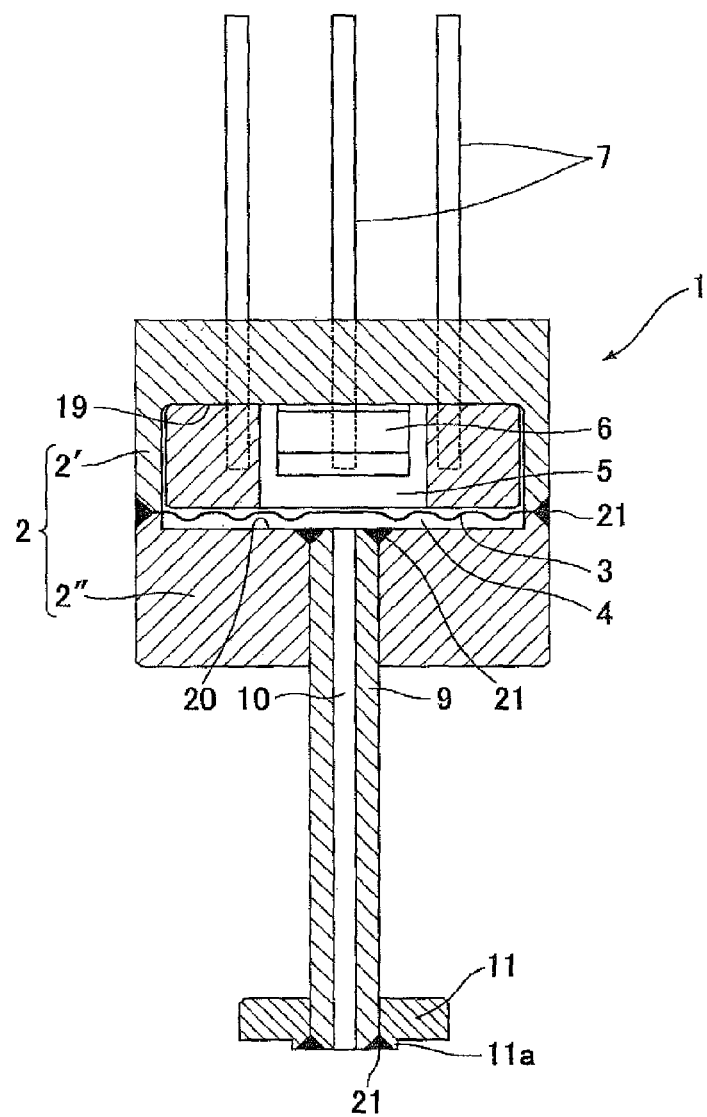
FIG. 2 is a longitudinal sectional view of the pressure detector shown in FIG. 1.

That is, the pressure detector 1 is composed of, as shown in FIG. 2, the casing 2 including the pipe 9 on which the pressure introduction hole 10 is formed, the partition diaphragm 3 which separates the inside of the casing 2 into the pressure receiving chamber 4 which brings with the pressure introduction hole 10 into communication and the pressure chamber 5 for filling a pressure transmission medium, the pressure detecting element 6 (pressure sensitive element) which is incorporated in the pressure chamber 5 and is operated by the displacement of the partition diaphragm 3, and the lead pin 7 inserted into the casing 2 and the like, and when a hydrostatic pressure is transmitted to the pressure detecting diaphragm (not illustrated) provided on the pressure detecting element 6 via the pressure introduction hole 10, the partition diaphragm 3 and a pressure transmission medium such as silicone oil, a voltage signal which is proportionate to the pressure from a semiconductor pressure transducer forming the pressure detecting element 6 is output to the outside via the lead pin 7.

The casing 2 is composed of the sensor base 2' and the tube base 2" in which spaces are formed, and at the center of the tube base 2", the pipe 9 made of stainless steel which communicates with an inner space and forms the pressure introduction hole 10 is inserted and fixed.

Specifically, the sensor base 2' is formed of stainless steel in the form of a disk, and on the lower face of the sensor base 2', a deep dent portion 19 which serves as the pressure chamber 5 which accommodates the pressure detecting element 6 and sealing the pressure transmission medium is formed.

In this embodiment, the outer diameter of the sensor base 2' is set to 8 mm, the thickness of the sensor base 2' is set to 3.5 mm, and the depth of the dent portion 19 of the sensor base 2' is set to accommodate the pressure detecting element 6.

Moreover, the tube base 2" is formed of stainless steel in the form of a disk, on the upper face of the tube base 2", a shallow dent portion 20 which communicates with the pressure introduction hole 10 to serve as the pressure receiving chamber 4 is formed.

In this embodiment, the outer diameter of the tube base 2" is set to 8 mm, the thickness of the tube base 2" is set to 3 mm, and the depth of the dent portion 20 of the tube base 2" is set to 0.3 mm.

Furthermore, the pipe 9 is formed by the pipe 9 made of stainless steel, and is inserted into and fixed onto the tube base 2" in an airtight manner by inserting a base end portion (upper end portion in FIG. 2) into the center of the tube base 2", and by welding 21 the outer peripheral portion of the base end portion of the pipe 9 onto the tube base 2". At this time, the pipe 9 is in a state of greatly protruding outwardly from the casing 2.

Moreover, on the outer circumferential face the front end portion of the pipe 9 (lower end portion in FIG. 2), the annular gasket presser 11 made of stainless steel and formed to have a larger diameter than the pipe 9 is stuck by the welding 21, and on the inner peripheral portion of the lower face of the gasket presser 11, a protrusion 11a for positioning fitted with the inner circumferential face of the gasket 12 is formed in a protruding manner.

In this embodiment, the outer diameter of the pipe 9 is set to 2.1 mm, the length of the pipe 9 is set to 10 mm, the outer diameter of the gasket presser 11 is set to 4 mm, the inner diameter of the gasket presser 11 is set to 2.1 mm, the thickness of the gasket presser 11 is set to 0.8 mm, and the height of the protrusion 11a of the gasket presser 11 is set to 0.2 mm.

The sensor base 2' and the tube base 2" nip the outer peripheral portion of the diaphragm 3 between the lower end face of the sensor base 2' and the upper end face of the tube base 2", and are assembled and fixed in an airtight manner by welding 21 the outer peripheral portion of the lower end face of the sensor base 2' and the outer peripheral portion of the upper end face of the tube base 2" and the outer peripheral portion of the diaphragm 3 throughout their circumferences, forming the casing 2 having a space thereinside.

At this time, the space formed in the casing 2 is separated into the pressure receiving chamber 4 which is in communication with the pressure introduction hole 10 and the pressure chamber 5 for filling a pressure transmission medium by the partition diaphragm 3 nipped between the sensor base 2' and the tube base 2".

It should be noted that as a pressure transmission medium to be charged into the pressure chamber 5, silicone oil having a low temperature expansion coefficient and a compression coefficient and being chemically stable is used, and this silicone oil transmits correctly the fluid pressure applied to the partition diaphragm 3 to the pressure detecting element 6.

The partition diaphragm 3 is formed in the form of a corrugated disk with an extremely thin metal plate made of Hastelloy.

In this embodiment, the outer diameter of the partition diaphragm 3 is set to 8 mm, the thickness of the partition diaphragm 3 is set to 0.025 mm, the height of corrugation of the partition diaphragm 3 is set to 0.175 mm, and the interval between the face of the partition diaphragm 3 on the pressure receiving chamber 4 side and the bottom face of the pressure receiving chamber 4 (the bottom face of the dent portion 20) is set to 0.15 mm.

The pressure detecting element 6 is accommodated in and fixed to the pressure chamber 5 of the casing 2, and a diffusion type semiconductor pressure transducer provided with a conventionally known pressure detecting diaphragm (not illustrated) is used as this pressure detecting element 6.

The pressure detector 1 mentioned above is, as shown in FIG. 1, attached and fixed in an airtight manner by the split ring 13 and the bonnet 14 via the gasket 12 in the insertion hole 16 of the attachment tool main body 15 made of metal attached to pipelines or mechanical devices.

The circular insertion hole 16 for attaching the pressure detector 1 is formed in the attachment tool main body 15, and a female screw 15a to which the bonnet 14 is removably screwed is formed on the inner circumferential face of the insertion hole 16.

Moreover, the bottom of the insertion hole 16 is formed to have a small diameter, and the gasket 12 is inserted into this small diameter portion.

Furthermore, at the center of the bottom face of the small diameter portion of the insertion hole 16, a communication hole 18 which brings the passage 17 formed in the attachment tool main body 15 and the inside of the insertion hole 16 into communication is formed.

The gasket 12 is formed to have a ring shape sized to be inserted into the small diameter portion of the insertion hole 16 with stainless steel, and the cross-sectional shape of the sheet portion thereof is form in the shape of a rectangular.

The outer circumferential face of this gasket 12 is in contact with the inner circumferential face of the small diameter portion of the insertion hole 16, one end face (lower face in FIG. 1) of the gasket 12 is in contact with the bottom face of the small diameter portion of the insertion hole 16, and further the other end face (upper face) of the gasket 12 is in contact with the front end face of the gasket presser 11.

In this embodiment, the outer diameter of the gasket 12 is set to 4 mm, the inner diameter of the gasket 12 is set to 2 mm, the width of the sheet portion of the gasket 12 is set to 1 mm, and the height of the sheet portion of the gasket 12 is set to 1 mm.

The split ring 13 is formed by dividing an annular component formed of stainless steel into two parts along the diameter direction, and a fitting recess portion 13a into which the gasket presser 11 is fitted is formed on the lower face of the split ring 13.

In this embodiment, the outer diameter of the split ring 13 is set to 6 mm, the inner diameter of the split ring 13 is set to 2.15 mm, the thickness of the split ring 13 is set to 1.8 mm, the inner diameter of the fitting recess portion 13a of the split ring 13 is set to 4 mm, and the depth of the fitting recess portion 13a of the split ring 13 is set to 0.8 mm.

The bonnet 14 is formed of stainless steel to be in the shape of a cylinder having an inner diameter which is larger than the outer diameter of the gasket presser 11 and smaller than the outer diameter of the split ring 13, and on its outer circumferential face a male screw 14a which is removably screwed to a female screw 15a formed on the inner circumferential face of the insertion hole 16 of the attachment tool main body 15 is formed.

Moreover, on the lower end face of the bonnet 14, a fitting portion 14b into which the split ring 13 is fitted is formed, and the shape of the upper end outer circumferential face (portion where the male screw 14a is not formed) of the bonnet 14 is formed to be approximately polygonal (square, hexagonal, etc.) so that the bonnet 14 can be rotated by a spanner or other tools.

In this embodiment, the outer diameter of the bonnet 14 is set to 8 mm, the inner diameter of the bonnet 14 is set to 4.2 mm, the height of the bonnet 14 is set to 5 mm, the inner diameter of the fitting portion 14b of the bonnet 14 is set to 6 mm, and the depth of the fitting portion 14b of the bonnet 14 is set to 1 mm.

Next, the case where the pressure detector 1 is integrated into the insertion hole 16 facing upward and formed on the attachment tool main body 15 will be described. It should be noted that FIG. 4 is an illustrative drawing which shows the integration procedure of the pressure detector 1 into the attachment tool main body 15.

First, the bonnet 14 is fitted onto the pipe 9 of the pressure detector 1 in a loosely fitted state (refer to FIG. 4 (A)). At this time, the inner diameter of the bonnet 14 is set to be larger than the outer diameter of the gasket presser 11, and therefore the bonnet 14 can be easily fitted onto the pipe 9.

Next, the split ring 13 is placed over the gasket presser 11 from the upper side of the gasket presser 11 with its inner circumferential face being brought into contact with the outer circumferential face of the pipe 9, the gasket presser 11 is fitted into the fitting recess portion 13a of the split ring 13 (refer to FIG. 4 (B)).

Then, the bonnet 14 is placed over onto the split ring 13 from the upper side of the split ring 13, the split ring 13 is fitted into the fitting portion 14b of the bonnet 14, and the split ring 13 is retained by the bonnet 14 so that it will not disassemble (refer to FIG. 4 (c)).

In addition, the gasket presser 11, the split ring 13 and the bonnet 14 are inserted into the insertion hole 16 of the attachment tool main body 15 with the gasket 12 inserted thereinto in advance, the bonnet 14 is inserted into the insertion hole 16, and the bonnet 14 is tightened to the attachment tool main body 15 side to press the gasket presser 11 and the gasket 12 by the split ring 13 (refer to FIG. 4 (D)).

This causes the gasket presser 11 to press the gasket 12, and sealing portions to be formed between one end face of the gasket 12 and the bottom face of the small diameter portion of the insertion hole 16 and between the other end face of the gasket 12 and the front end face of the gasket presser 11, respectively, so that the pressure detector 1 is attached to the insertion hole 16 in an airtight manner.

In the structure for attaching the pressure detector 1 mentioned above, when the bonnet 14 is tightened to the attachment tool main body 15 side, the gasket presser 11 receives compressive force via the gasket 12 and the split ring 13, but the gasket presser 11 is provided on the front end portion of the pipe 9 greatly protruding outwardly from the casing 2. Therefore, the distance between the gasket presser 11 which receives the compressive force and the partition diaphragm 3 of the pressure detector 1 is increased. Thus, even when the gasket presser 11 receives the compressive force, its component of force is not transmitted to the partition diaphragm 3 at all.

As a result, in the structure for attaching this pressure detector 1, even after being integrated into the attachment tool main body 15 of the pressure detector 1, no stress influence is exerted on the partition diaphragm 3, and no stress influence is exerted on the pressure detecting element 6 provided with the pressure detecting diaphragm, which eliminates variations in output and temperature characteristics before and after the attachment of the pressure detector 1 onto the attachment tool main body 15.

Moreover, in the structure for attaching this pressure detector 1, after being integrated into the attachment tool main body 15 of the pressure detector 1, even if the tightening force of the bonnet 14 decreases due to aged deterioration and the compressive force of the gasket presser 11 changes, since the gasket presser 11 which receives the compressive force and the partition diaphragm 3 of the pressure detector 1 are widely apart, no stress influence is exerted on the partition diaphragm 3, and the partition diaphragm is not affected by aged deterioration.

Similarly, even in the cases where other devices, for example, an orifice is attached and fixed in the vicinity of the mounting portion of the pipeline to which the pressure detector 1 is attached, the partition diaphragm 3 is not affected by the stress caused by the fixing of the orifice.

It should be noted that the results of the characteristics test before and after the pressure detector 1 is attached to the pipeline reveal that almost no change has been found in the offset voltage, span voltage, linearity of output signals, temperature characteristics, etc. of the pressure detector 1.

In the above-mentioned embodiment, the pressure detector 1 is attached to the insertion hole 16 facing upward and formed on the attachment tool main body 15, but in other embodiments, the pressure detector 1 may be attached to the insertion hole 16 facing downward or sideways formed on the attachment tool main body 15.

Even in this case, effects similar to those mentioned above can be produced.

Moreover, in the above-mentioned embodiment, the bonnet 14, the gasket 12, the split ring 13, and other components are made of stainless steel, but suitable materials may be selected depending on external circumstances and the like such as the type, temperature, etc. of the fluid running through the pipeline. Furthermore, the partition diaphragm 3 is formed as a corrugated disk of an extremely thin metal plate made of Hastelloy, but it is needless to say that its material and shape may vary depending on the use conditions.

Figure 5:
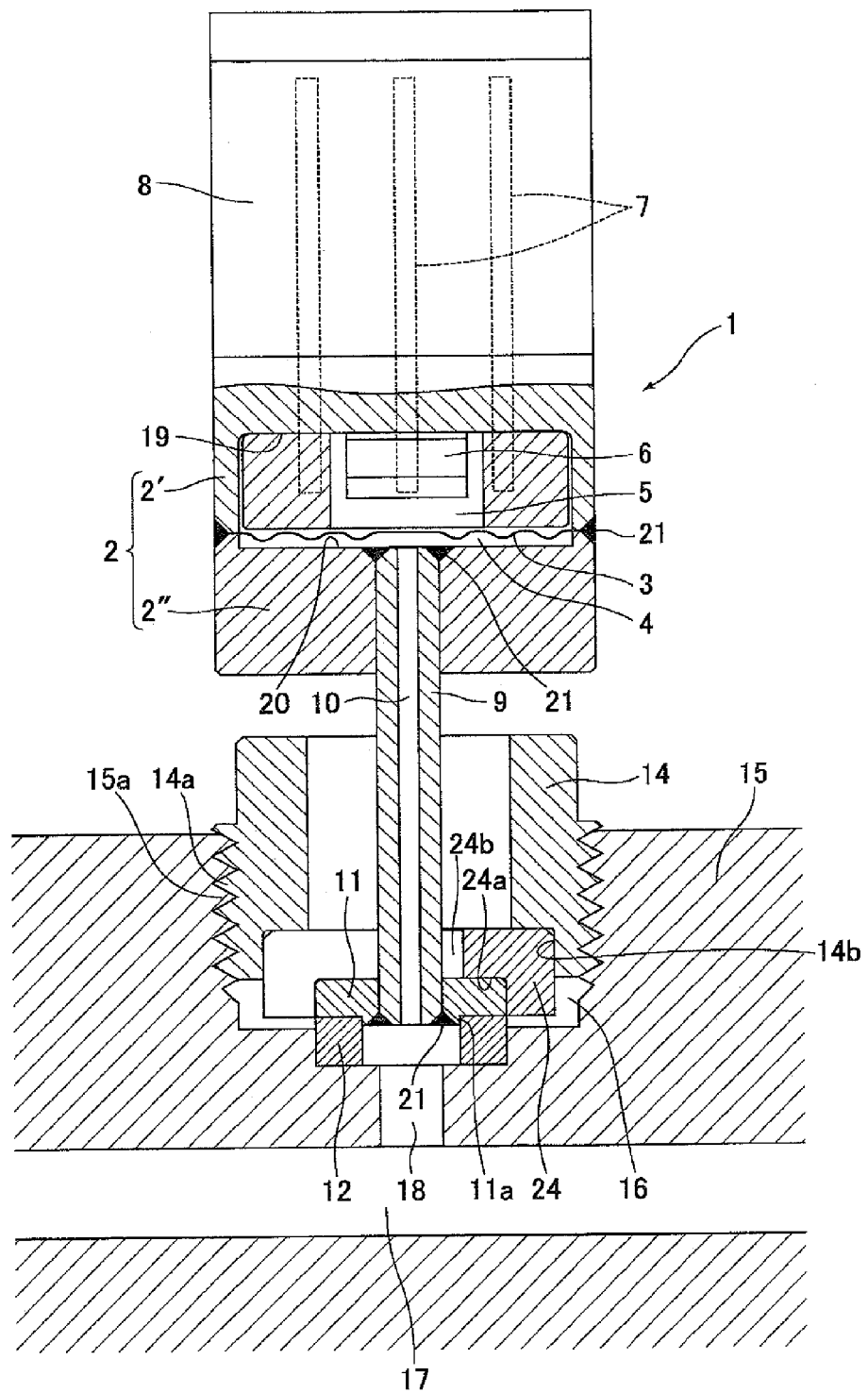
FIG. 5 is a longitudinal sectional view showing a structure for attaching a pressure detector according to another embodiment of the present invention

FIG. 5 shows the structure for attaching the pressure detector according to other embodiments of the present invention. The structure for attaching the pressure detector shown in FIG. 5 includes a pipe 9 provided on a casing 2 in a state of protruding outwardly to form a pressure introduction hole 10, an annular gasket presser 11 provided at the front end of the pipe 9, a gasket 12 to which the front end face of the gasket presser 11 is inserted at the bottom of an insertion hole 16 of an attachment tool main body 15, a U-shaped ring 24 which comes into contact with the face on the side opposite to the front end face of the gasket presser 11, and has an insertion portion into which the pipe 9 is inserted, and a bonnet 14 which is removably inserted into the insertion hole 16 of the attachment tool main body 15 and presses the U-shaped ring 24, in which the gasket presser 11 and the U-shaped ring 24 are inserted into the insertion hole 16 of the attachment tool main body 15, and the bonnet 14 is inserted into the insertion hole 16, the bonnet 14 is tightened to the attachment tool main body 15 side to press the gasket presser 11 and the gasket 12 by the U-shaped ring 24, so that sealing portions are formed between one end face of the gasket 12 and the bottom face of the insertion hole 16 and between the other end face of the gasket 12 and the front end face of the gasket presser 11, respectively.

Figure 3A:
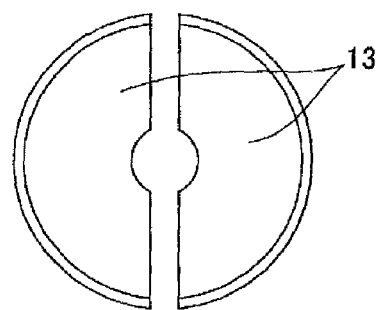
FIG. 3 shows a split ring used for the structure for attaching the pressure detector, where (A) is a plan view of the split ring, and (B) is a longitudinal sectional view of the split ring.
Figure 3B:
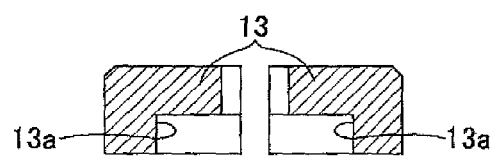
Figure 4A:
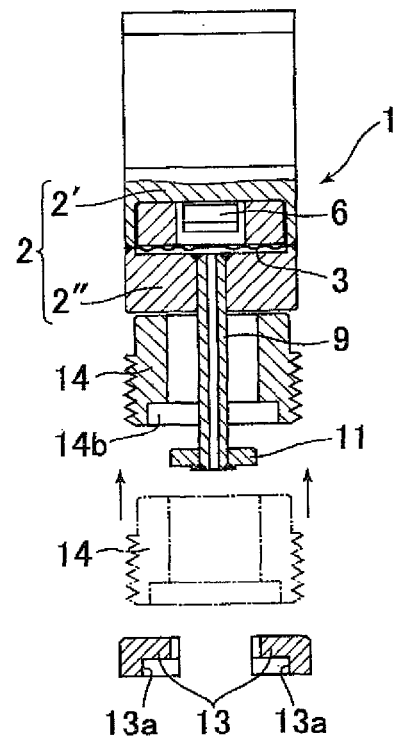
FIG. 4 is an illustrative drawing which shows the assembly procedure of the pressure detector shown in FIG. 1 to an attachment tool main body.
Figure 4B:
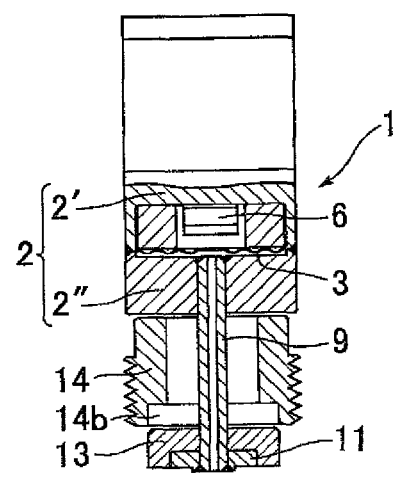
Figure 4C:
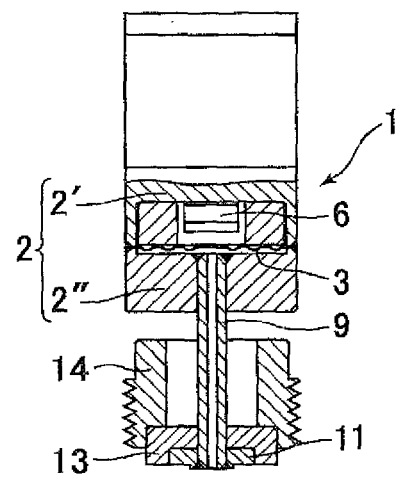
Figure 4D:
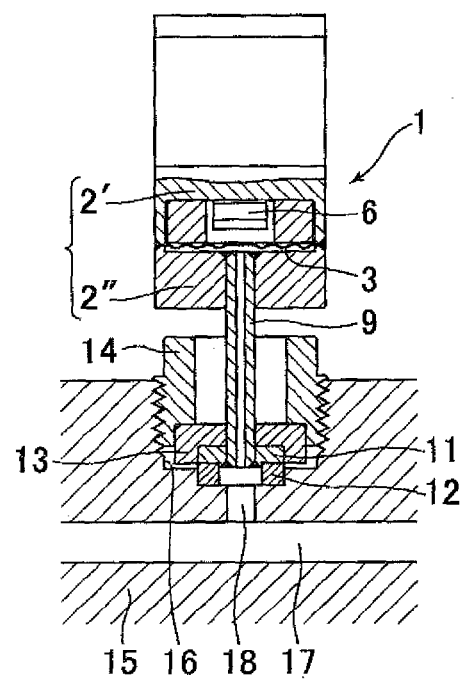

In the structure for attaching the pressure detector, the U-shaped ring 24 shown in FIGS. 6 (A) and (B) described later is used in place of the split ring 13 shown FIGS. 3 (A) and (B), and the same structure and same shape as those in the structure for attaching the pressure detector 1 shown in FIG. 1 are employed except for the U-shaped ring 24. The same portions and components as those in the structure for attaching shown in FIG. 1 are referred to as the same reference numerals, and their detailed explanation is omitted.

Figure 6A:
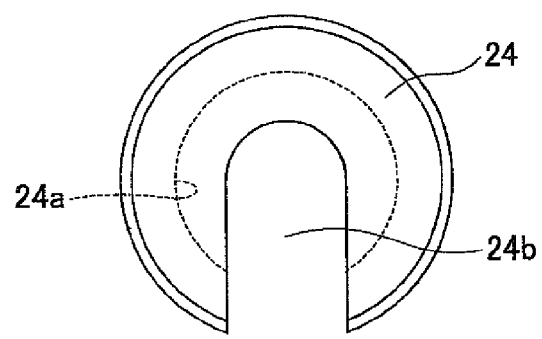
FIG. 6 shows an U-shaped ring used for the structure for attaching the pressure detector, where (A) is a plan view of the U-shaped ring, and (B) is a longitudinal sectional view of the U-shaped ring.
Figure 6B:
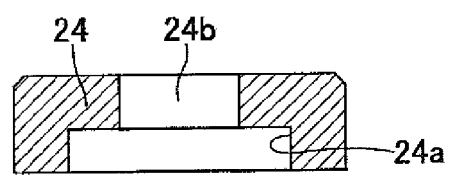

The U-shaped ring 24 is, as shown in FIGS. 6 (A) and (B), formed of stainless steel in the shape of a planer U, and a fitting recess portion 24a into which the gasket presser 11 is fitted into is formed on the lower face of the U-shaped ring 24.

Moreover, the U-shaped ring 24 has an insertion portion 24b formed in the shape of a notch or a dent from an outer peripheral portion towards the center, and the pipe 9 is inserted into the insertion portion 24b from the outer periphery side of the U-shaped ring 24.

In this embodiment, the outer diameter of the U-shaped ring 24 is set to 6 mm, the width of the insertion portion of the U-shaped ring 24 is set to 2.15 mm, the thickness of U-shaped ring 13 is set to 1.8 mm, the inner diameter of the fitting recess portion 24a of U-shaped ring 13 is set to 4 mm, and the depth of the fitting recess portion 13a of U-shaped ring 13 is set to 0.8 mm.

The structure for attaching the pressure detector 1 shown in FIG. 5 can also produce the effects similar to those by the structure for attaching the pressure detector 1 shown in FIG. 1.

Figure 7:
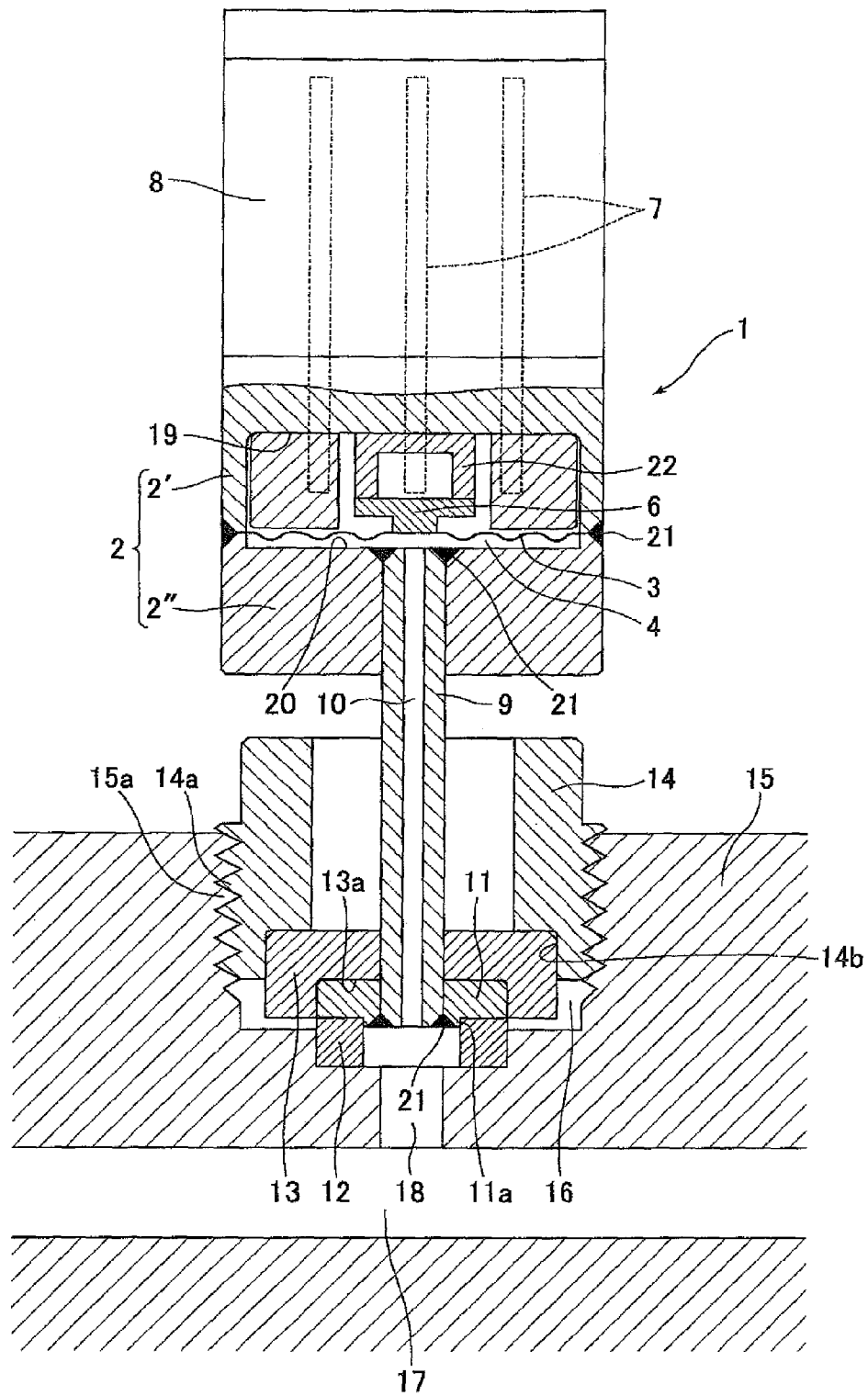
FIG. 7 is a longitudinal sectional view of the state that a different type of a pressure detector is attached to the insertion hole of the attachment tool main body.

FIG. 7 shows the state that a different type of the pressure detector 1 using no pressure transmission medium is attached to the insertion hole 16 of the attachment tool main body 15, and the structure for attaching this pressure detector 1 employs the same structure and same shape as the structure for attaching the pressure detector 1 shown in FIG. 1 (or FIG. 5). The same portions and components as those in the mounting structure shown in FIG. 1 are referred to as the same reference numerals, and their detailed explanation is omitted.

In the pressure detector 1 shown in FIG. 7, the pressure detecting element 6 (pressure sensitive element) provided with the pressure detecting diaphragm (not illustrated) is retained by a receiving table 22 provided in the dent portion 19 of the sensor base 2', and the lower end face of the pressure detecting element 6 is brought into direct contact with the upper face of the partition diaphragm 3 which is displaced depending on the pressure of the pressure receiving chamber 4, so that the pressure applied on the partition diaphragm 3 from the pressure introduction hole 10 via the pressure receiving chamber 4 is transmitted directly to the pressure detecting element 6.

Figure 8:
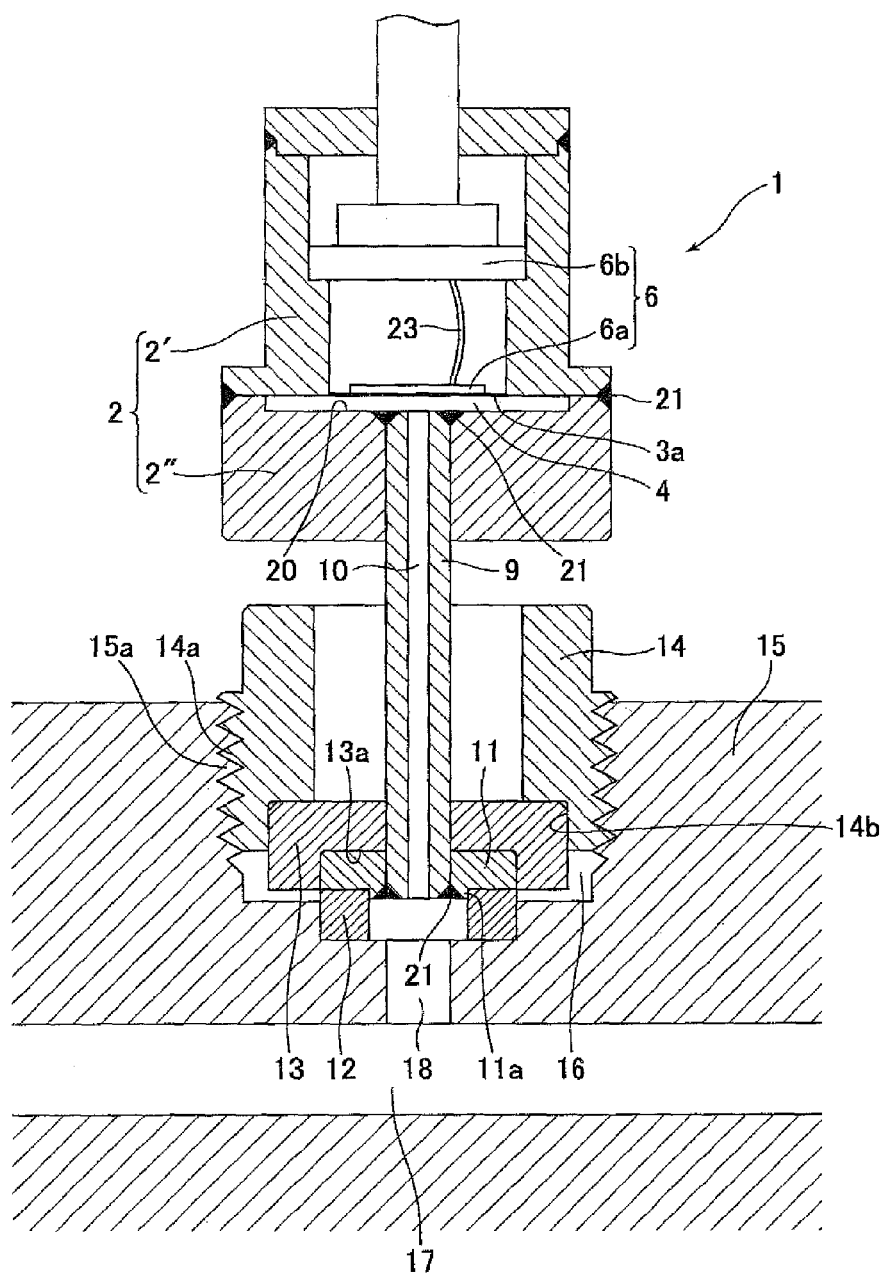
FIG. 8 is a longitudinal sectional view of the state that still another type of a pressure detector is attached to the insertion hole of the attachment tool main body.
Figure 9:
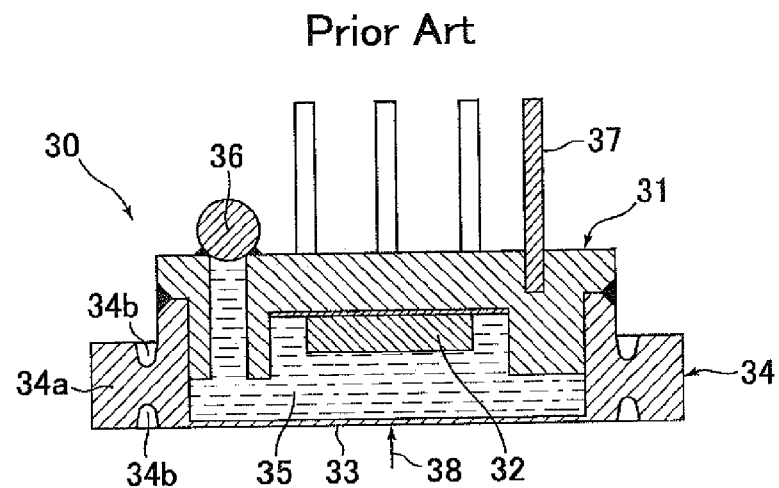
FIG. 9 is a longitudinal sectional view which shows an example of a conventional pressure detector.
Figure 10:
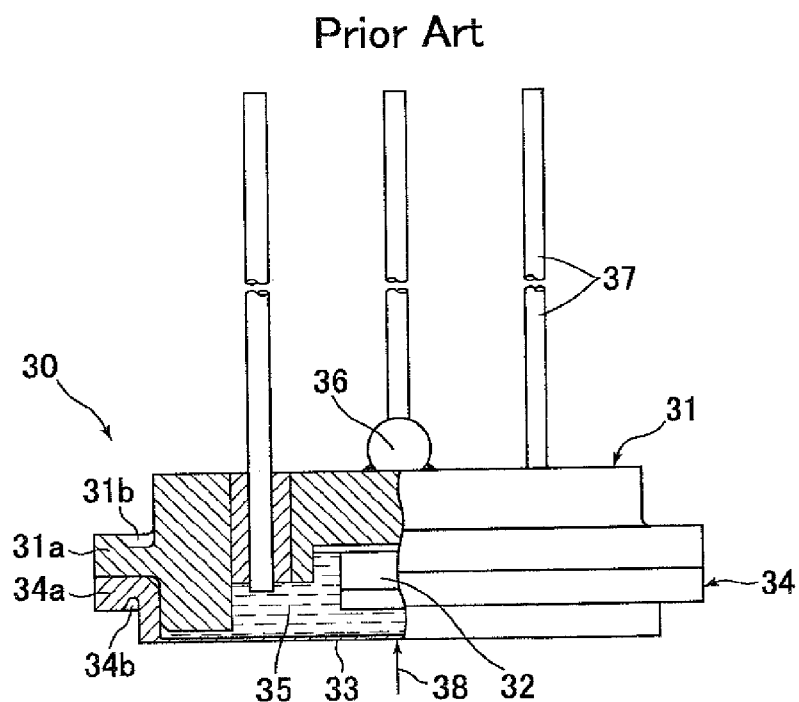
FIG. 10 is a longitudinal sectional view which shows another example of a conventional pressure detector.
Figure 11:
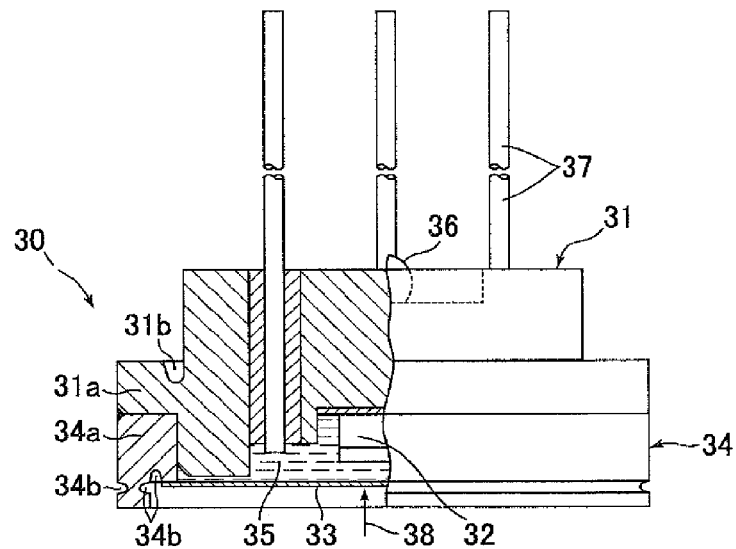
FIG. 11 is a longitudinal sectional view which shows still another example of a conventional pressure detector.
Figure 12:
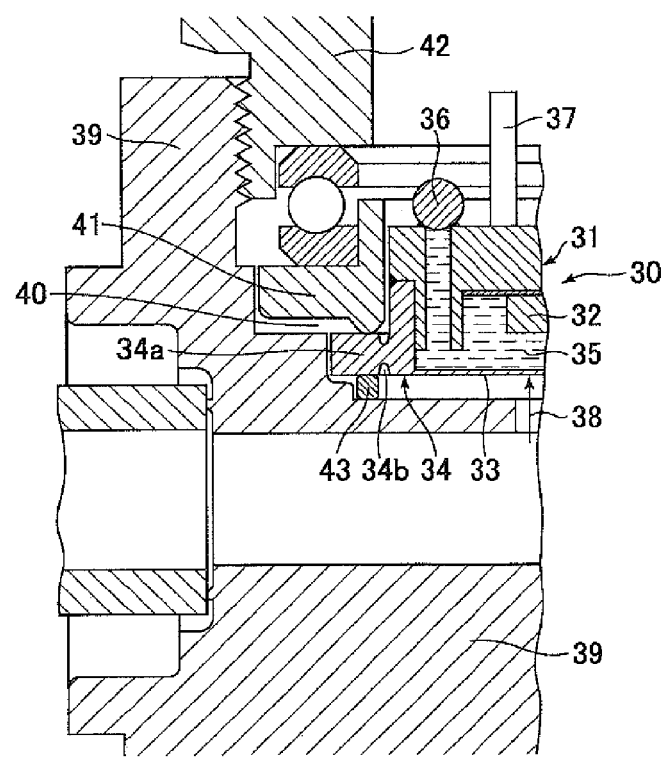
FIG. 12 is an enlarged fragmentary cross-sectional view which shows the structure for attaching the pressure detector shown in FIG. 9.
Figure 13:
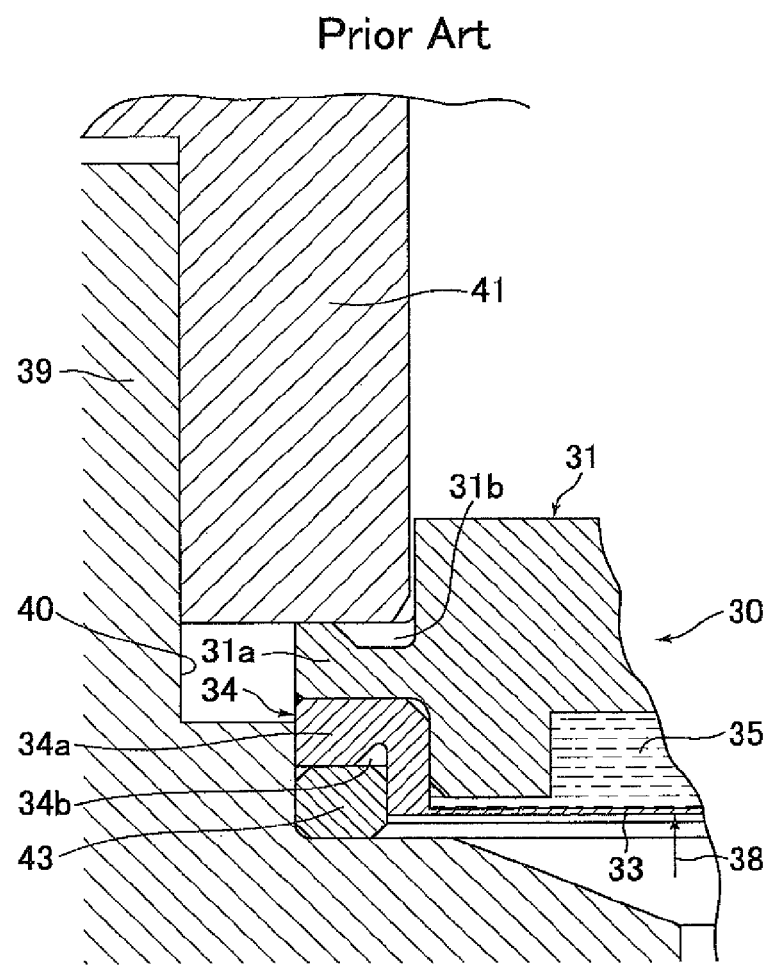
FIG. 13 is an enlarged fragmentary cross-sectional view which shows the structure for attaching the pressure detector shown in FIG. 10.
Figure 14:
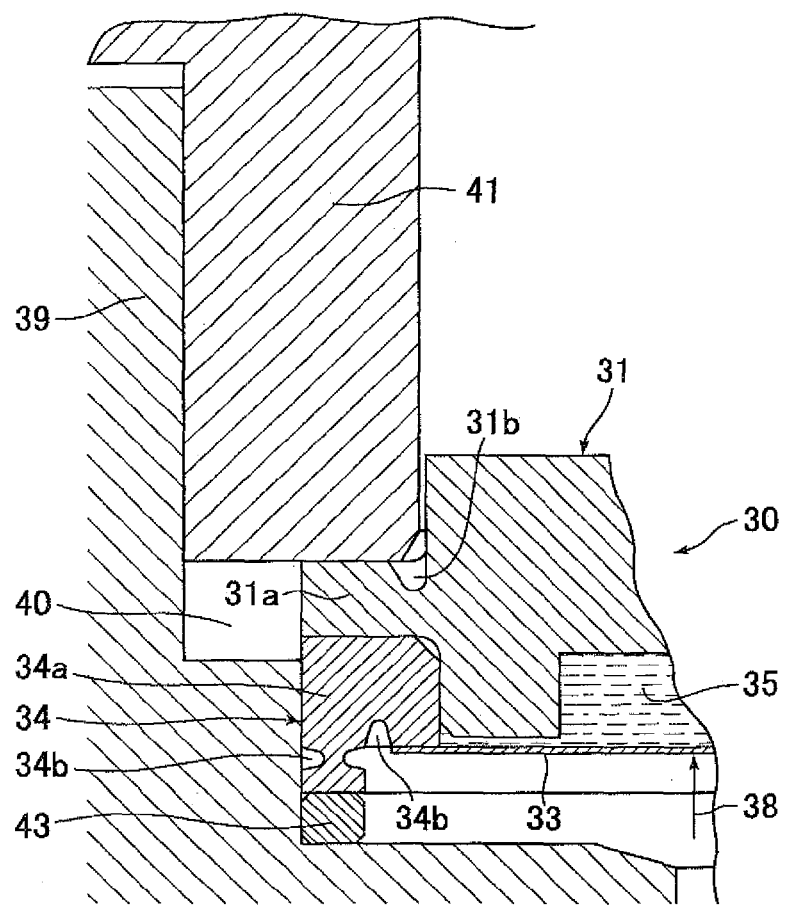
FIG. 14 is an enlarged fragmentary cross-sectional view which shows the structure for attaching the pressure detector shown in FIG. 11.

Moreover, FIG. 8 shows the state that a still another type of the pressure detector 1 also using no pressure transmission medium is attached to the insertion hole 16 of the attachment tool main body 15, and the structure for attaching this pressure detector 1 employs the same structure and same shape as the structure for attaching the pressure detector 1 shown in FIG. 1 (or FIG. 5). The same portions and components as those in the mounting structure shown in FIG. 1 are referred to as the same reference numerals, and their detailed explanation is omitted.

The pressure detector 1 shown in FIG. 8 uses a metal strain gauge provided with a strain gauge portion 6a formed in a film shape by covering a resistance wire made of a metal fine line or metal foil with an insulator as the pressure detecting element 6, in which the strain gauge portion 6a is stuck to the upper face of diaphragm 3a which is displaced depending on the pressure of the pressure receiving chamber 4, a bridge circuit 6b which detects a change in the resistance is attached within the sensor base 2', and the strain gauge portion 6a and the bridge circuit 6b are connected with a wiring 23.

It should be noted that in the pressure detector 1 of FIG. 8, the metal strain gauge in which the strain gauge portion 6a and the bridge circuit 6b are separate is used, but a metal strain gauge so constituted that the two components are combined may be stuck to the upper face of the diaphragm 3a.

Moreover, in the pressure detector 1 of FIG. 8, the diaphragm 3a is formed integrally with the sensor base 2', but, for example, an independent pressure transducer may be used as the pressure detecting element 6 of FIG. 1, and the partition diaphragm 3 and the pressure transmission medium may be done away with, whereby the diaphragm 3a can be formed separately from the sensor base 2'.

At this time, a diffusion type pressure transducer is not used as the pressure transducer, the diaphragm is formed of stainless steel, Hastelloy, or ceramics, and a strain gauge is formed with a thick film or thin film directly on this diaphragm, whereby a pressure detector having excellent corrosion resistance and thermal resistance can be provided.

In the above-mentioned embodiment, in FIGS. 1 to 7, the diaphragm which is composed of the two components: the partition diaphragm 3 and the pressure detecting diaphragm, has been explained while in FIG. 8, an embodiment in which the diaphragm is composed of one component has been explained, but it is needless to say the constitution of the diaphragm is not limited to these.

REFERENCE SIGNS LIST 1 is a pressure detector, 2 is a casing, 2' is a sensor base, 2" is a tube base, 3 is a partition diaphragm, 3a is a diaphragm, 4 is a pressure receiving chamber, 5 is a pressure chamber, 6 is a pressure detecting element, 6a is a strain gauge portion, 6b is a bridge circuit, 7 is a lead pin, 8 is a cover, 9 is a pipe, 10 is a pressure introduction hole, 11 is a gasket presser, 11a is a protrusion of the gasket presser, 12 is a gasket, 13 is a split ring, 13a is a fitting recess portion of the split ring, 14 is a bonnet, 14a is a male screw of the bonnet, 14b is a fitting portion of the bonnet, 15 is an attachment tool main body, 15a is a female screw of the attachment tool main body, 16 is an insertion hole, 17 is a passage, 18 is a communication hole, 19 is a dent portion of a sensor base, 20 is a dent portion of the tube base, 21 is a welding, 22 is a receiving table, 23 is a wiring, 24 is a U-shaped ring, 24a is a fitting recess portion of the U-shaped ring, 24b is an insertion portion of the U-shaped ring.

What is claimed is:

1. A structure for attaching a pressure detector air-tightly into an insertion hole of an attachment tool main body attached to pipelines or mechanical devices comprising:
   a pressure detector having:
      a casing forming a pressure introduction hole,
      a pressure receiving chamber being provided in the casing and communicating with the pressure introduction hole, a diaphragm displacing depending on the pressure of the pressure receiving chamber, and a pressure detecting element converting a pressure caused by the displacement of the diaphragm into an electrical signal; and the structure for attaching the pressure detector comprising:

a pipe protruding outwardly on the casing and forming the pressure introduction hole;

an annular gasket presser with a diameter larger than the pipe provided at the front end of the pipe;

an annular gasket provided on the bottom face of the insertion hole of the attachment tool main body and abutting against the front end surface of the gasket presser;

a split ring abutting against the face opposite to the front end face of the gasket presser; and a bonnet pressing the split ring removably inserted into the insertion hole of the attachment tool main body, wherein:

the gasket presser and the split ring are inserted into the insertion hole of the attachment tool main body, the bonnet is inserted into the insertion hole and tightened on a side of the attachment tool main body, the gasket presser and the gasket are pressed by the split ring, sealing portions are formed between one end face of the gasket and the bottom face of the insertion hole and between another end face of the gasket and the front end face of the gasket presser.

2. The structure for attaching a pressure detector according to claim 1, wherein:

the diaphragm of the pressure detector includes:
a partition diaphragm receiving pressure from the pressure introduction hole,
a pressure detecting diaphragm having the pressure detecting element, and
a pressure chamber filled with a pressure transmission medium between the partition diaphragm and the pressure detecting diaphragm.

3. The structure for attaching a pressure detector according to claim 1, wherein:

the split ring is divided into two parts along the diameter direction; the bonnet is configured as a cylindrical bonnet having an inner diameter larger than an outer diameter of the gasket presser and smaller than an outer diameter of the split ring; and the bonnet is removably screwed into the insertion hole of the attachment tool main body.

4. A structure for attaching a pressure detector air-tightly into an insertion hole of an attachment tool main body attached to pipelines or mechanical devices comprising:

a pressure detector having:
a casing forming a pressure introduction hole,
a pressure receiving chamber provided in the casing and communicating with the pressure introduction hole,
a diaphragm displacing depending on the pressure of the pressure receiving chamber, and
a pressure detecting element converting a pressure caused by the displacement of the diaphragm into an electrical signal;

the structure for attaching the pressure detector comprising:

a pipe protruding outwardly on the casing and forming the pressure introduction hole;

an annular gasket presser with a diameter larger than the pipe provided at the front end of the pipe, an annular gasket provided on the bottom face of the insertion hole of the attachment tool main body and abutting against the front end face of the gasket presser; and, a U-shaped ring abutting against the face opposite to the front end face of the gasket presser and having an insertion portion that the pipe is inserted, and a bonnet removably inserted into the insertion hole of the attachment tool main body to press the U-shaped ring, wherein:

the gasket presser and the U-shaped ring are inserted into the insertion hole of the attachment tool main body, the bonnet is inserted into the insertion hole, and tightened to a side of the attachment tool main body, the gasket presser and the gasket are pressed by the U-shaped ring; sealing portions are formed between one end face of the gasket and the bottom face of the insertion hole and between the other end face of the gasket and the front end face of the gasket presser.

5. The structure for attaching a pressure detector according to claim 4, wherein:

the diaphragm of the pressure detector includes:
a partition diaphragm receiving pressure from the pressure introduction hole,
a pressure detecting diaphragm having the pressure detecting element, and
a pressure chamber filled with a pressure transmission medium between the partition diaphragm and the pressure detecting diaphragm.

* * * * *